US011558097B2

(12) United States Patent  (10) Patent No.: US 11,558,097 B2
Yerramalli et al.  (45) Date of Patent: Jan. 17, 2023

(54) ENHANCEMENTS TO CHANNEL STATE INFORMATION REPORTING

(71) Applicant: QUALCOMM Incorporated, San Diego, CA (US)

(72) Inventors: Srinivas Yerramalli, Hyderabad (IN); Xiaoxia Zhang, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/070,758

(22) Filed: Oct. 14, 2020

(65) Prior Publication Data

US 2021/0143883 A1  May 13, 2021

Related U.S. Application Data

(60) Provisional application No. 62/933,105, filed on Nov. 8, 2019.

(51) Int. Cl.
*H04W 52/24* (2009.01)
*H04B 7/06* (2006.01)
*H04L 1/00* (2006.01)
*H04B 17/391* (2015.01)
*H04B 17/345* (2015.01)

(52) U.S. Cl.
CPC ......... *H04B 7/0626* (2013.01); *H04B 17/345* (2015.01); *H04B 17/3913* (2015.01); *H04L 1/0026* (2013.01)

(58) Field of Classification Search
CPC . H04B 17/345; H04B 17/3913; H04W 24/10; H04L 1/0026
See application file for complete search history.

(56) References Cited

U.S. PATENT DOCUMENTS 9,107,174 B2 * 8/2015 Senarath ............. H04W 52/146
2011/0081871 A1 * 4/2011 Molnar ..................... H04L 1/20
455/452.2

(Continued)

FOREIGN PATENT DOCUMENTS

EP  2692076 A1  2/2014
EP  3541111 A1 * 9/2019 ............. H04B 7/024

(Continued)

OTHER PUBLICATIONS

International Search Report and Written Opinion—PCT/US2020/055730—ISA/EPO—dated Jan. 28, 2021.

*Primary Examiner* — Lan-Huong Truong
(74) *Attorney, Agent, or Firm* — Patterson & Sheridan L.L.P.

(57) ABSTRACT

Certain aspects of the present disclosure provide techniques for enhancements to channel state information (CSI) reporting. A method that may be performed by a user equipment (UE) includes obtaining, from a network entity, a CSI reporting configuration for reporting CSI for a channel. The method further includes generating a model of an interference pattern for the channel, and predicting one or more candidate interference levels for one or more upcoming slots using the model. The method further includes reporting information regarding the candidate interference levels to the network entity.

30 Claims, 10 Drawing Sheets

(56) References Cited

U.S. PATENT DOCUMENTS

| | | | | |
|---|---|---|---|---|
| 2014/0073313 A1* | 3/2014 | Hammarwall | ........ | H04W 24/02 |
| | | | | 455/422.1 |
| 2016/0034823 A1* | 2/2016 | Farkas | .................. | H04W 16/22 |
| | | | | 706/14 |
| 2019/0097693 A1* | 3/2019 | Park | ....................... | H04L 5/0023 |
| 2020/0120510 A1* | 4/2020 | Gresset | ................... | B61L 27/40 |
| 2020/0252310 A1* | 8/2020 | Thampy | ................. | G06N 3/088 |
| 2020/0389371 A1* | 12/2020 | Tedaldi | ................... | H04L 45/28 |

FOREIGN PATENT DOCUMENTS

| | | | | | |
|---|---|---|---|---|---|
| EP | | 3541111 A1 | 9/2019 | | |
| WO | | 2012105793 A2 | 8/2012 | | |
| WO | | 2013141781 A1 | 9/2013 | | |
| WO | WO-2013141781 A1 * | | 9/2013 | ........... | H04B 17/345 |

* cited by examiner

ENHANCEMENTS TO CHANNEL STATE INFORMATION REPORTING

CROSS-REFERENCE TO RELATED APPLICATION(S)

This application claims benefit of and priority to U.S. Provisional Application No. 62/933,105, filed Nov. 8, 2019, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for enhancing channel state information (CSI) reporting.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved interference estimates for CSI reporting.

Certain aspects provide a method for wireless communication. The method generally includes obtaining, from a network entity, a channel state indicator (CSI) reporting configuration for reporting CSI for a channel. The method generally includes generating a model of an interference pattern for the channel. The method generally includes predicting one or more candidate interference levels for one or more upcoming slots using the model. The method generally includes reporting information regarding the candidate interference levels to the network entity.

Certain aspects provide a method for wireless communications by a network entity. The method generally includes transmitting, to a UE, a CSI reporting configuration for reporting a CSI for a channel. The method generally includes receiving from the UE, as part of the CSI reporting, information regarding one or more candidate interference levels for one or more upcoming slots.

Certain aspects provide an apparatus for wireless communication. The apparatus generally at least one processor and memory coupled to the at least one processor. The memory generally includes code executable by the at least one processor to cause the apparatus to obtain, from a network entity, a CSI reporting configuration for reporting CSI for a channel. The memory generally includes code executable by the at least one processor to cause the apparatus to generate a model of an interference pattern for the channel. The memory generally includes code executable by the at least one processor to cause the apparatus to predict one or more candidate interference levels for one or more upcoming slots using the model. The memory generally includes code executable by the at least one processor to cause the apparatus to report information regarding the candidate interference levels to the network entity.

Certain aspects provide an apparatus for wireless communications by a network entity. The apparatus generally at least one processor and memory coupled to the at least one processor. The memory generally includes code executable by the at least one processor to cause the apparatus to transmit, to a UE, a CSI reporting configuration for reporting a CSI for a channel. The memory generally includes code executable by the at least one processor to cause the apparatus to receive from the UE, as part of the CSI reporting, information regarding one or more candidate interference levels for one or more upcoming slots.

Certain aspects provide an apparatus for wireless communication. The apparatus generally includes means for obtaining, from a network entity, a CSI reporting configuration for reporting CSI for a channel. The apparatus generally includes means for generating a model of an interference pattern for the channel. The apparatus generally includes means for predicting one or more candidate interference levels for one or more upcoming slots using the model. The apparatus generally includes means for reporting information regarding the candidate interference levels to the network entity.

Certain aspects provide an apparatus for wireless communications by a network entity. The apparatus generally includes means for transmitting, to a UE, a CSI reporting configuration for reporting a CSI for a channel. The apparatus generally includes means for receiving from the UE, as part of the CSI reporting, information regarding one or more candidate interference levels for one or more upcoming slots.

Certain aspects provide a computer-readable medium storing computer executable code thereon for wireless communication. The computer-readable medium generally includes code for obtaining, from a network entity, a CSI reporting configuration for reporting CSI for a channel. The computer-readable medium generally includes code for generating a model of an interference pattern for the channel. The computer-readable medium generally includes code for predicting one or more candidate interference levels for one or more upcoming slots using the model. The computer-readable medium generally includes code for reporting information regarding the candidate interference levels to the network entity.

Certain aspects provide a method for wireless communications by a network entity. The computer-readable medium generally includes code for transmitting, to a UE, a CSI reporting configuration for reporting a CSI for a channel. The computer-readable medium generally includes code for receiving from the UE, as part of the CSI reporting, information regarding one or more candidate interference levels for one or more upcoming slots.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
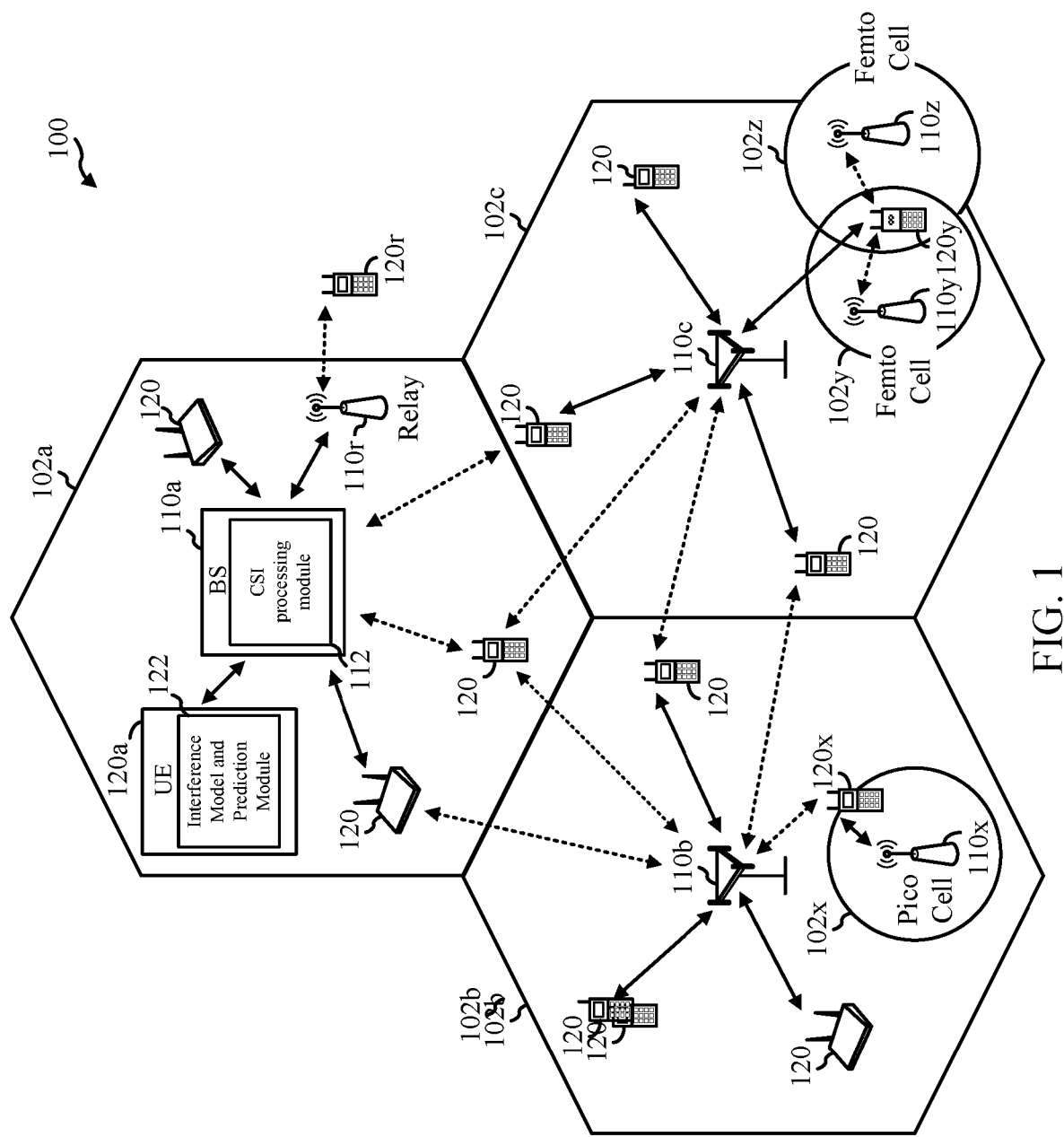
FIG. 1 is a block diagram conceptually illustrating an example telecommunications system, in accordance with certain aspects of the present disclosure.
Figure 1:
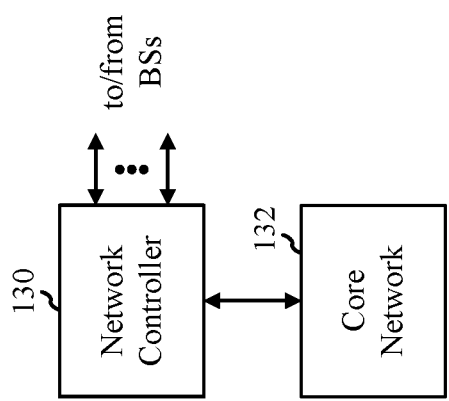

Aspects of the present disclosure provide apparatus, methods, processing systems, and computer readable mediums for enhanced channel state information (CSI) reporting.

A CSI report is based on a channel and interference estimate. Generally, the time and frequency resource locations from which the channel and interference estimates are controlled by a base station (BS) configuration. While channel estimates are generally stable over time, interference estimates may change rapidly. As channel conditions between a user equipment (UE) and a BS change, it is important for the UE to report certain CSI parameters (e.g., channel quality indicator (CQI), precoding matrix index (PMI), and rank indicator (RI)) about the latest channel conditions to the BS (e.g., BS 110a).

However, the rapid interference changes may reduce the usefulness of CQI reports in general, as the CQI value has little correlation to the expected CQI in the upcoming slots. Aspects of the present disclosure generally include techniques that may be considered enhancements to interference estimates for CSI reporting, by modeling and predicting candidate interference levels for upcoming slots.

The following description provides examples of improved interference estimates for CSI reporting in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

Figure 4:
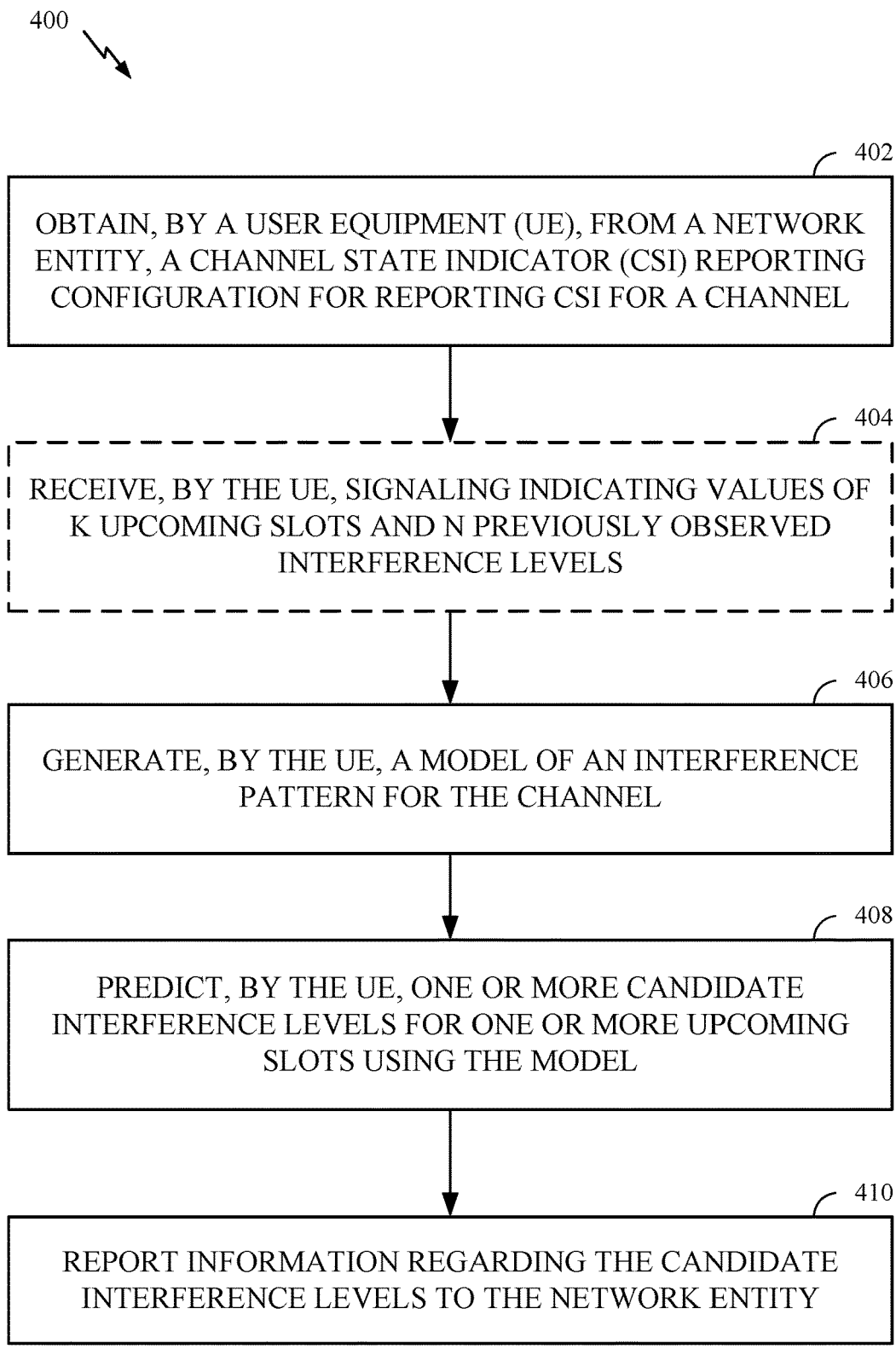
FIG. 4 is a flow diagram illustrating example operations for wireless communication by a UE, in accordance with certain aspects of the present disclosure.
Figure 5:
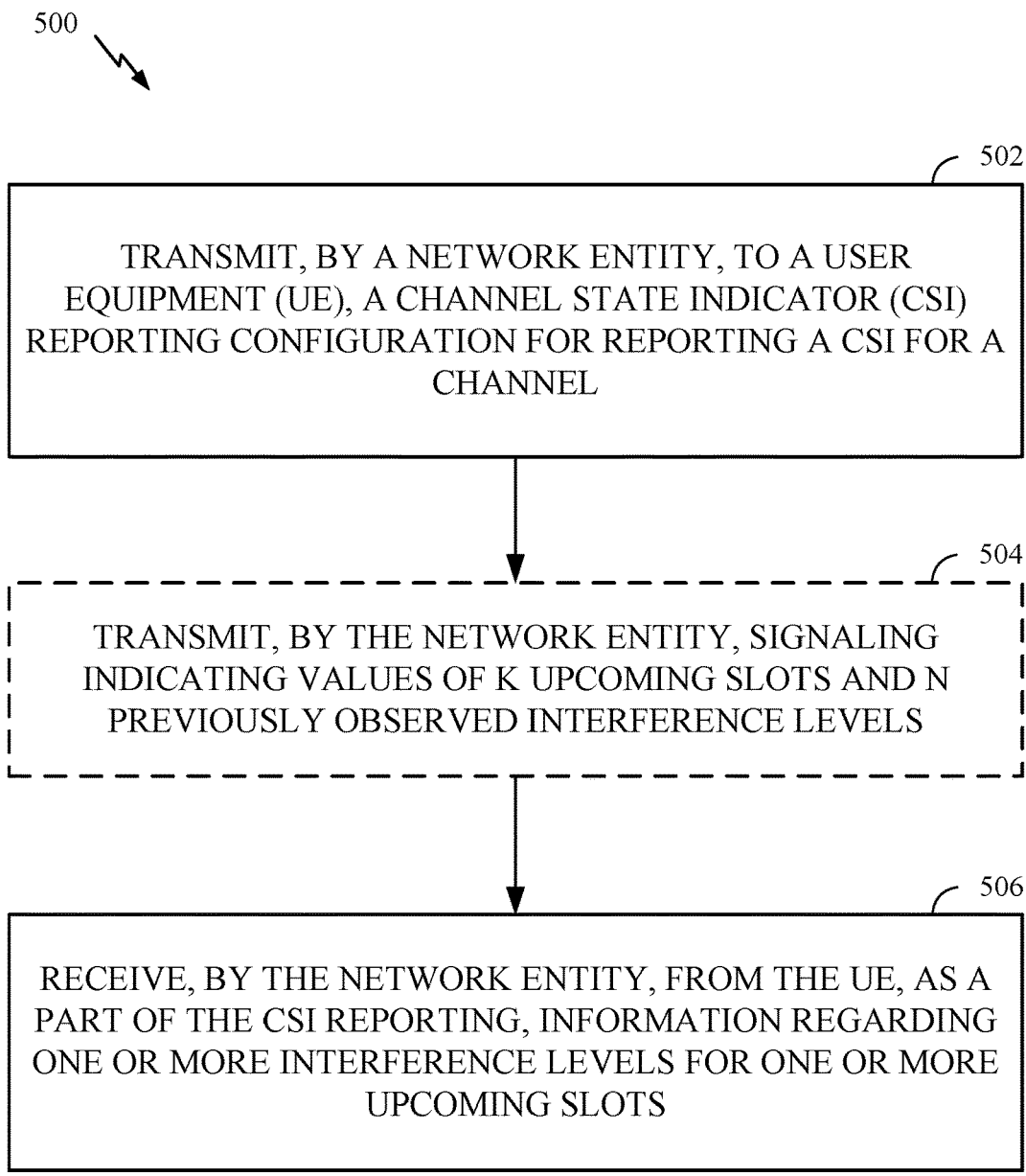
FIG. 5 is a flow diagram illustrating example operations for wireless communication by a BS, in accordance with certain aspects of the present disclosure.

As shown, the BS 110a may include a CSI processing module 112 that may be configured to perform (or cause BS 110a to perform) operations 500 of FIG. 5. Similarly, UE 120a may include an interference model and prediction module 122 that may be configured to perform (or cause UE 120a to perform) operations 400 of FIG. 4.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
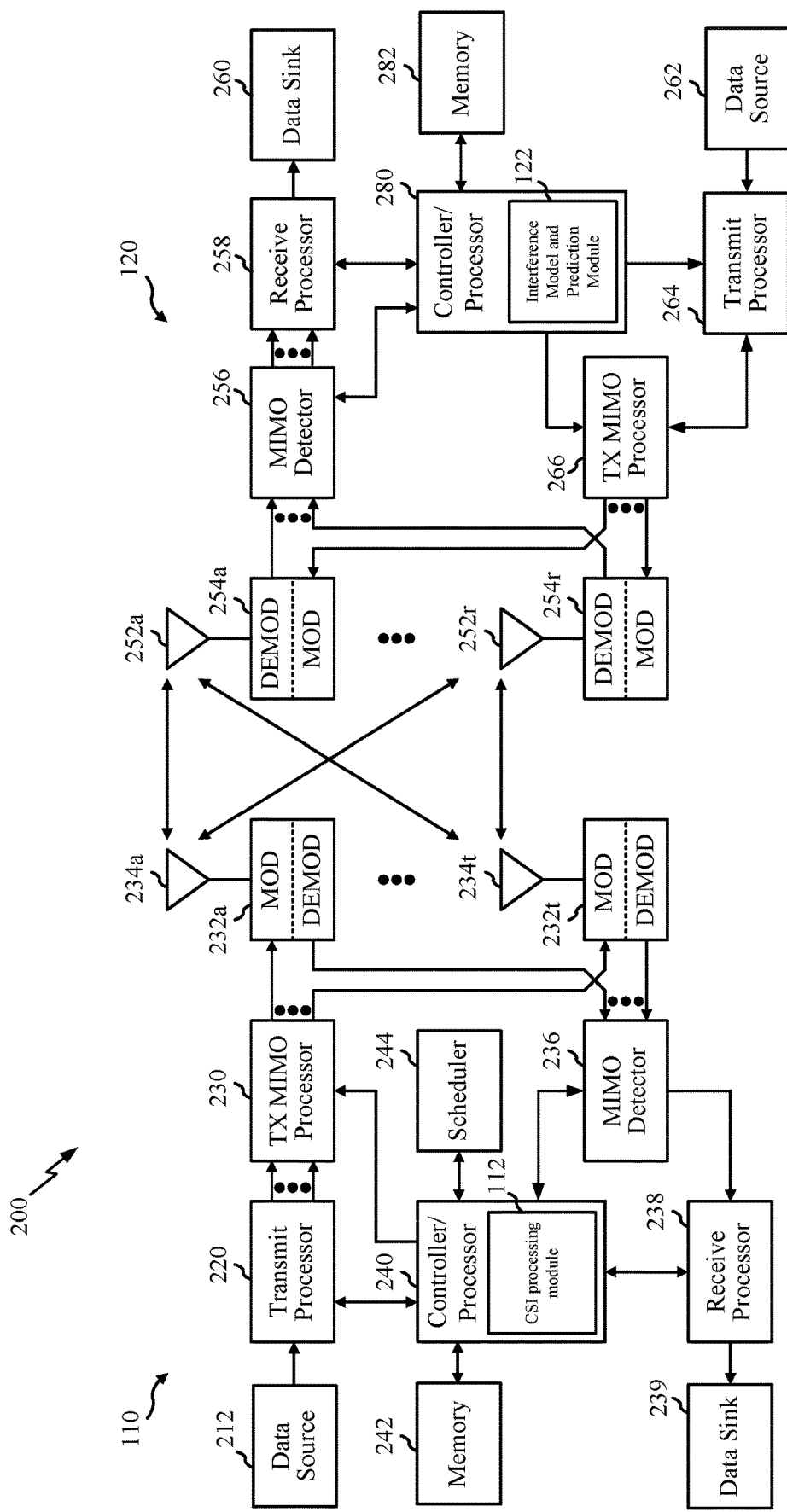
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively.

The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 240 of the BS 110a has a CSI processing module 112 that may be configured to perform operations 500 of FIG. 5. As shown in FIG. 2, the controller/processor 280 of the UE 120a has an interference model and prediction module 122 that may be configured to perform operations 400 of FIG. 4. Although shown at the Controller/Processor, other components of the UE 120a and BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
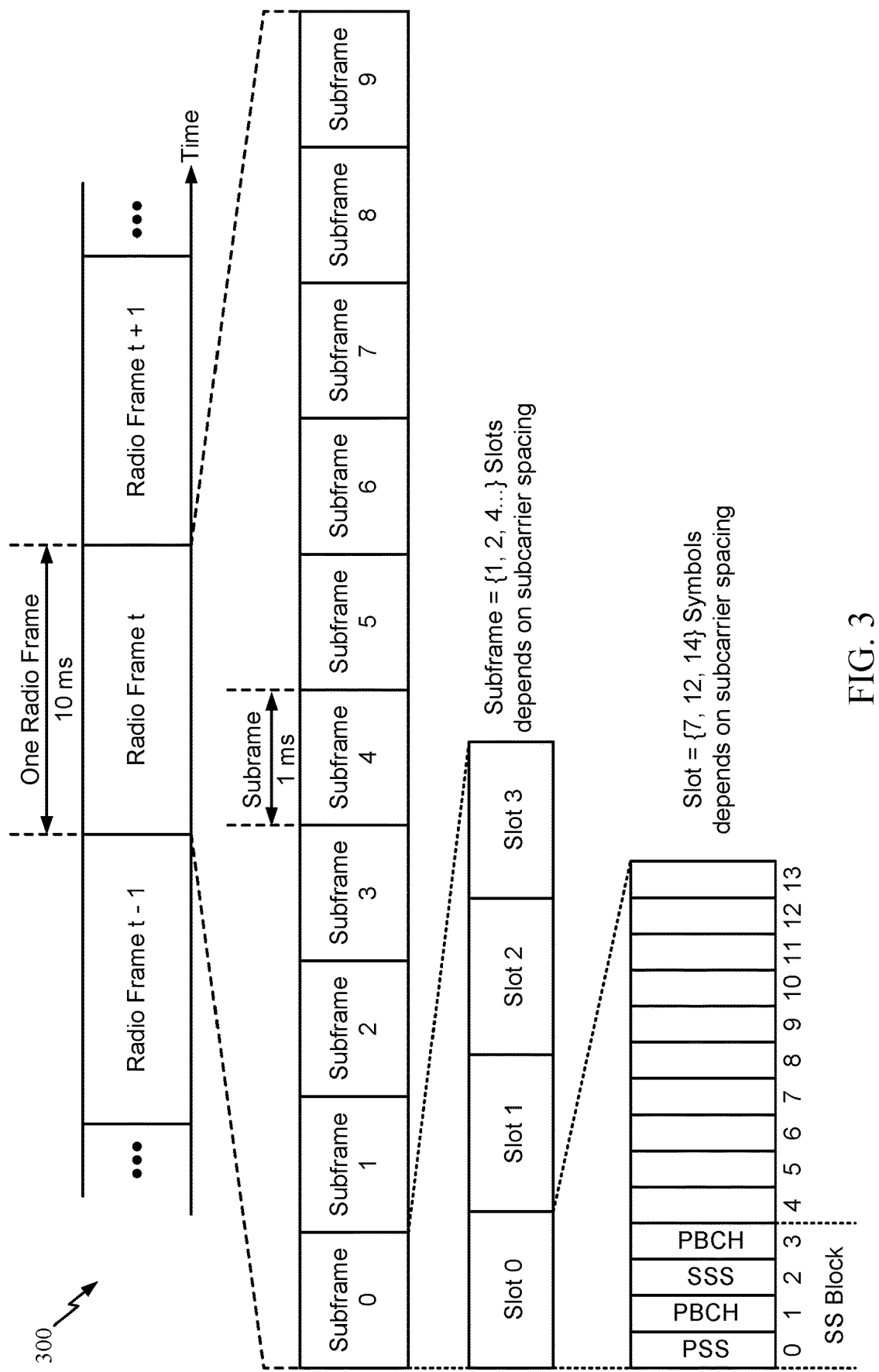
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example CSI Configuration

CSI may refer to channel properties of a communication link. The CSI may represent the combined effects of, for example, scattering, fading, and power decay with a distance between a transmitter and a receiver. Channel estimation using pilots, such as CSI reference signals (CSI-RS), may be performed to determine these effects on a channel. The CSI may be used to adapt transmissions based on current channel conditions, which is useful for achieving reliable communication, in particular, with high data rates in multi-antenna systems. The CSI is typically estimated at the receiver, quantized, and fed back to the transmitter.

A UE (e.g., such as a UE 120a) may be configured by a BS (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure time and frequency resources used by the UE to report the CSI. For example, the CSI report configuration may be associated with CSI-RS resources for channel measurement (CM), interference measurement (IM), or both. The CSI report configuration may configure the CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). The CSI-RS resources can be zero power (ZP) or non-zero power (NZP) resources. At least one NZP CSI-RS resource may be configured for CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

For the Type I single panel codebook, the PMI may include a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. The BS may have a plurality of transmit (TX) beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix},$$

where b represents the oversampled beam (e.g., discrete Fourier transform (DFT) beam), for both polarizations, and φ is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

As channel conditions between a UE and a BS (e.g., such as between the UE 120*a* and the BS 110*a*) change, it is important for the UE to report certain CSI parameters (e.g., CQI, PMI, and RI) about the latest channel conditions to the BS. In certain aspects, the UE transmits a CSI report to the BS to indicate channel conditions to the BS. The BS then utilizes the received CSI report to improve communications with the UE. For example, a CSI report may be used to improve a modulating and coding scheme (MCS), precoder, rank, beam selection, etc.

Typically, a CSI report is based on a single channel and interference estimate. Generally, the time and frequency resource locations from which the channel and interference estimates are based (e.g., such as the CSI-RS resources sets in new radio (NR), or subframe sets in LTE) are controlled by the configuration from the BS. The BS may also control the periodicity and averaging of the interference estimates. For example, the BS may configure the UE with periodic, semi-periodic, or aperiodic configurations for sending CSI reports. The BS may also configure infinite impulse response (IIR) filtering of channel and interference values. The BS may also configure the resources to share spatial relationships (e.g., so reference signals sent on these resources are received by the same receiver beam), for example, via quasi co-location (QCL) indications.

While channel estimates are generally stable over time, interference estimates may change rapidly for each scheduling unit (e.g., slot). For example, the UE may detect strong interference or no interference, depending on the beam from the BS, causing swings in the detected interference estimates/levels. The differences in interference estimates for each scheduling slot can depend on the scheduling strategy of the interfering scheduler. These rapid interference changes may reduce the usefulness of CQI reports in general, as the CQI value has little correlation to the expected CQI in in the upcoming slots. With increasing spatially directed transmissions in NR, the swings in interference levels between two interference measurement resources may be quite large, which may increase this problem significantly.

In order to address the swings in interference estimates, the BS may average the interference estimates in multiple CSI reports to schedule and use hybrid automatic repeat request (HARQ) retransmissions to correct any errors in the interference estimates. Alternatively, the UE may average interference estimates to send in a CSI report, and then the BS again relies on HARQ retransmissions to correct any errors. Generally, when a BS averages the interference estimates, the BS has more information to make scheduling decisions. However, if the BS does not average the interference estimates, then the BS still needs to be able to determine which CQI reports are valid to make scheduling decisions. Accordingly, what is needed are techniques and apparatus for improving interference estimates for CSI reporting.

Example Enhancements to CSI Reporting

Aspects of the present disclosure generally include techniques that may be considered enhancements to interference estimates for channel state information (CSI) reporting, by modeling and predicting candidate interference levels for upcoming slots. The modeling may be trained with actual observed interference values.

By training with actual observed interference values from previous slots, the modeling may recognize a recurring structure to the interference pattern (e.g., round robin, group round robin, minimum number of slots, maximum number of slots) and use this information to predict multiple candidate values of interference levels in upcoming slots. In some cases, modeling interference may detect a temporary pattern recognition.

The candidate interference levels generally refer to predicted interference levels based on previously observed interference levels used to train a predictive model. The predicted interference levels may be also based on an analysis of the previously observed interference levels used to train the predictive model. Each candidate interference level may be associated with a probability of occurrence. In some cases, the candidate interference levels may be mapped or associated to a transmission from one or more neighboring cells. The candidate interference levels and corresponding probability of occurrence in a CSI report may be used by a base station (BS) improve on the interference estimates in CSI reporting as the BS has more information on channel condition to use to improve communication with the user equipment (UE).

FIG. 4 is a flow diagram illustrating example operations 400 for wireless communication, in accordance with certain aspects of the present disclosure. The operations 400 may be performed, for example, by a UE (e.g., such as the UE 120a in the wireless communication network 100). The operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 400 begin, at 402, by obtaining, from a network entity, a CSI reporting configuration for reporting CSI for a channel. For example, the UE may be configured with resources for the CSI reporting (e.g., such CSI reference signal (CSI-RS) resource sets, CSI interference measurement (CSI-IM) resource sets, etc.), quantities to report, etc.

In some aspects, at 404, the UE may receive signaling indicating a number, K, of upcoming slots for which the UE may predict candidate interference levels and a number, N, of previously observed interference levels. The UE may be configured to predict candidate interference levels for K upcoming slots, using observed interference levels for N prior slots as input to the model. In some cases, the UE may determine the last N slots to be used for this computation based on the CSI-RS configuration, physical downlink shared channel (PDSCH) received in slots quasi-colocated (QCLed) with the CSI-RS.

At 406, the UE generates a model of an interference pattern for the channel. The model of the interference pattern may take into account a history of the observed interference values. The model of the interference pattern may be generated using a neural network, such as a recurrent neural network (RNN), a long short-term memory (LSTM) neural network, and a deep recurrent neural network. The model of the interference pattern may be trained in real-time and using observed interference values.

At 408, the UE predicts one or more candidate interference levels for one or more upcoming slots using the model. As mentioned, the candidate interference levels generally refer to predicted interference levels based on previously observed interference levels used to train a predictive model. The predicted interference levels may be also based on an analysis of the previously observed interference levels used to train the predictive model. Each candidate interference level may be associated with a probability of occurrence. In some cases, the candidate interference levels may be mapped or associated to a transmission from one or more neighboring cells.

At 410, the UE reports information regarding the candidate interference levels to the network entity. The UE may provide the information regarding the candidate interference level via a CSI report. The candidate interference levels and corresponding probability of occurrence in a CSI report may be used by a network entity improve on the interference estimates in CSI reporting as the network entity has more information on channel condition to use to improve communication with the UE.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100). The operations 500 may be complementary to the operations 400 performed by the UE. The operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 500 begin, at 502, by transmitting, to a UE, a CSI reporting configuration for reporting a CSI for a channel.

In some aspects, at 504, the network entity may transmit signaling indicating a number, K, of upcoming slots for which the UE may predict candidate interference levels and a number, N, of previously observed interference levels. The UE may be configured to predict candidate interference levels for K upcoming slots, using observed interference levels for N prior slots as input to the model. In some cases, the network entity may configure the UE with values of K and N (e.g., via the CSI reporting configuration).

Figure 6:
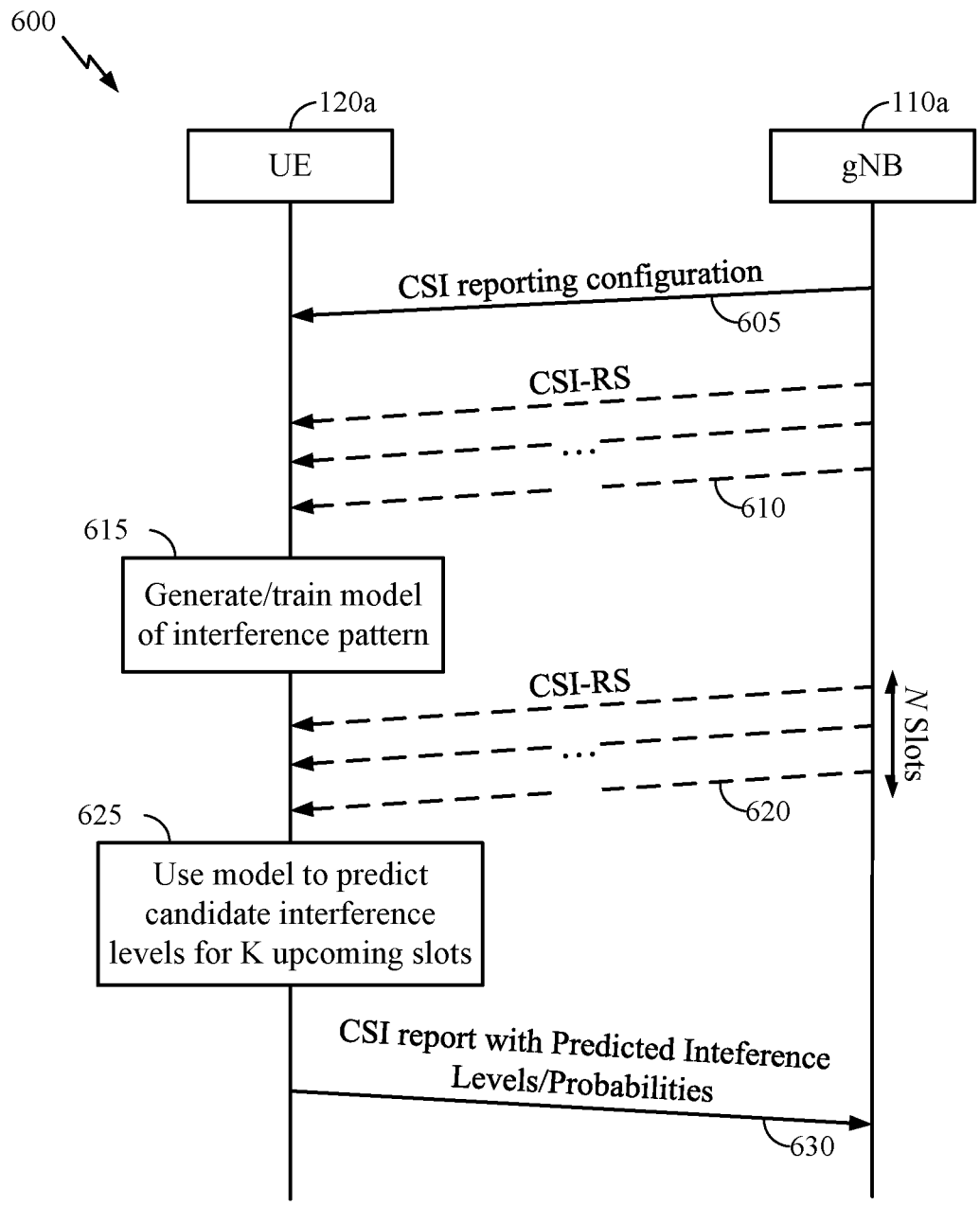
FIG. 6 is a call flow diagram illustrating example signaling between the UE and the BS, in accordance with aspects of the present disclosure.

At 506, the network entity receives, from the UE, as a part of the CSI reporting, information regarding one or more interference levels for one or more upcoming slots. The network entity may receive the information regarding the candidate interference level via a CSI report. The candidate interference levels and corresponding probability of occurrence in a CSI report may be used by a network entity improve on the interference estimates in CSI reporting as the network entity has more information on channel condition to use to improve communication with the UE FIG. 6 is a call flow diagram that illustrates how a UE may generate and train an interference pattern model and use this model to predict interference levels for upcoming slots. The UE can report the predicted interference levels to a BS.

As illustrated, at 605, the gNB 110a configures the UE 120a with a CSI reporting configuration. The CSI reporting configuration may indicate time and/or frequency resources for CSI-RS transmission from the gNB 110a.

At 610, the UE may observe the CSI-RS transmission(s) sent over multiple slots. When observing the CSI-RS transmission(s), the UE may observe the interference levels from the CSI-RS transmission(s).

At 615, the UE may use the observed interference levels from the CSI-RS transmission(s) to generate and train the predictive model. For example, the model may be trained using machine learning. The model may be implemented using an artificial neural network. The machine learning and/or artificial neural network can perform modeling of time series data to obtain a probability density function of expected interference in upcoming slots. In some cases, the model may be generated by modeling time series data involving the observed interference levels. The model may be generated/trained by taking into account a history of the observed interference values. A history of the observed interference values may involve a windowed version of the observed interference values, or a finite history of the observed interference values. In some cases, the model may be updated and/or refined with a history of the observed interference values. The model may be trained in real time or offline (e.g., using stored observed values). The UE use any suitable algorithm (not necessarily a neural network) to model and predict the interference.

Once trained, the UE may use the model to predict candidate interference levels (and corresponding probabilities) for upcoming slots, based on observed interference levels for previous slots.

Figure 7:
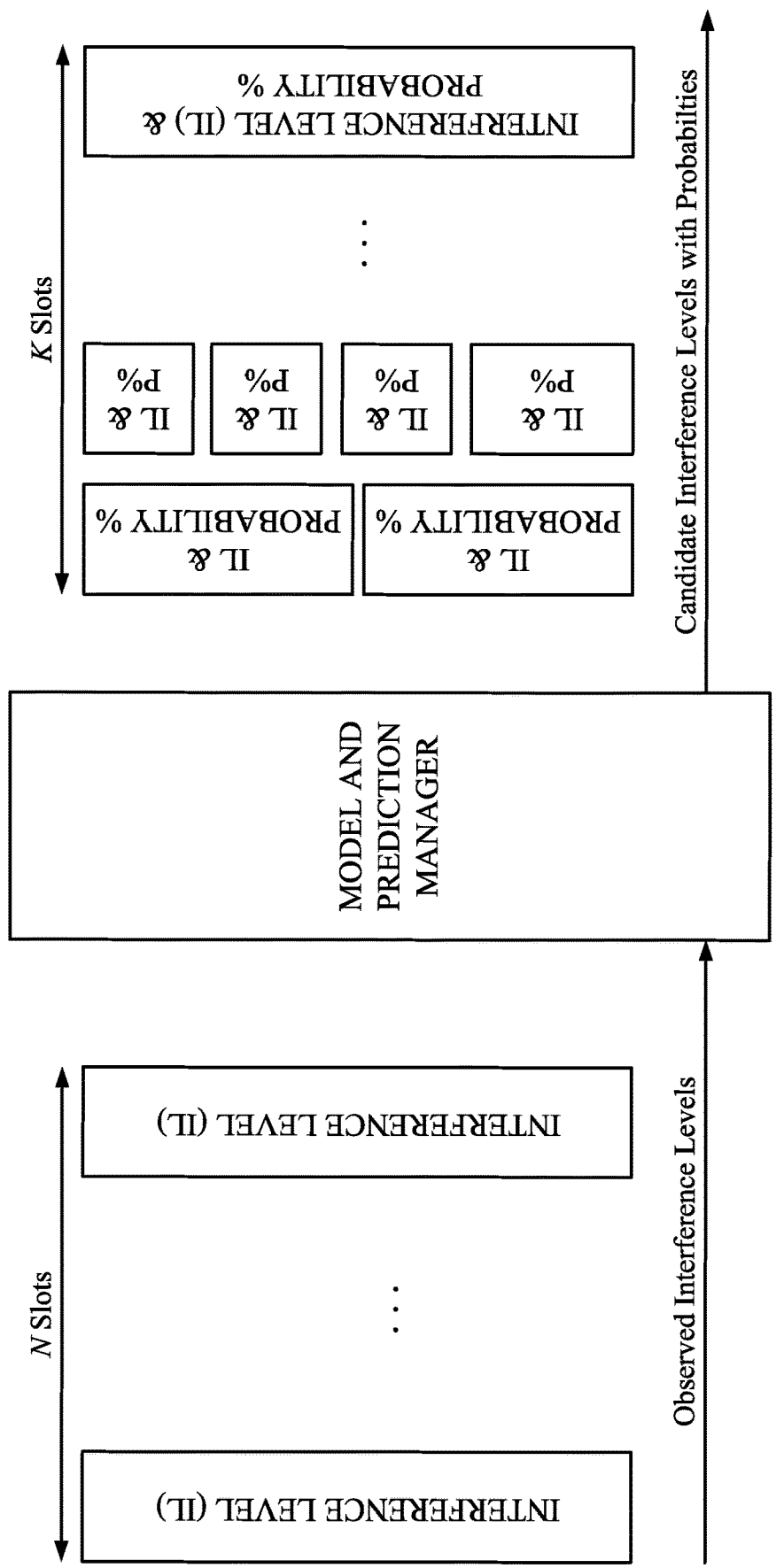
FIG. 7 illustrates a model and predictor manager for improved channel state information (CSI) reporting, in accordance with certain aspects of the present disclosure.

For example, as illustrated in FIG. 7, the UE may be configured to use a model to predict candidate interference levels for K upcoming slots, using observed interference levels for N prior slots as input to the model. In some cases, the gNB may configure the UE with values of K and N (e.g., via the CSI reporting configuration). In some cases, the UE may determine the last N slots to be used for this computation based on the CSI-RS configuration, PDSCH received in slots QCLed with the CSI-RS.

As illustrated in FIG. 7, each slot N can have a candidate interference level. Each of the candidate interference levels may have a corresponding probability of occurrence (noted as probability % or P %). In some aspects, the UE may generate a probability density function (PDF) of the candidate interference levels and the corresponding probabilities of occurrence. For example, the UE can generate the probability using the machine learning algorithm, artificial neural network, etc.

Returning to FIG. 7, the UE may report the predicted interference level candidates and probabilities for the K slots, for example, using a CSI reporting framework. For example, the UE may report the information regarding the candidate interference levels to the network entity via a CSI report. The UE may report a single interference level and probability per slot, may report multiple interference levels and probabilities per slot, or could report interference level and probability over multiple slots.

There are various options for the quantity and content of the reported information. The information to the network entity may include pre-configured candidate interference levels and the corresponding probability of occurrence the pre-configured candidate interference levels. For example, the UE may be configured to report the probability of occurrence of a pre-configured interference level (e.g., of 5 decibels). In some aspects, the information to the network entity includes information from a PDF generated by the UE, the PDF including information of the candidate interference levels and corresponding probabilities of occurrence. In some aspects, the information to the network entity includes information regarding a subset of the candidate interference levels selected based on their probability of occurrence. The subset of candidate interference levels may have P candidate interference levels, and these candidate interference levels may have the highest probability of occurrence among the predicted candidate interference levels. For example, the subset includes 2 candidate interference levels with the highest probabilities of "50%" and "40%" from the candidate interference levels. In some examples, the information regarding the neural network model may include weights of the neural network model after training the model.

While the examples above have assumed prediction performed at the UE side, in some cases, with sufficient reporting, the prediction may be implemented at the network (gNB) side. Prediction may make sense at the UE side, particularly if interference is measured on resources other than CSI-RS and CSI-IM reference signals, such as Demodulation Reference Signal (DMRS) or PDSCH.

As mentioned above, the UE may use machine learning for predicting the interference levels and probabilities. In some examples, the UE may use a machine learning (ML) algorithm to form the prediction(s) discussed above and/or for reporting CSI to the BS based on the prediction(s).

In some examples, machine learning involves training a model, such as a predictive model. The model may be used to predict a feasible duration a missing packet may be received. The model may be used to perform the prediction(s) discussed above and/or other factors. The model may be trained based on training data (e.g., training information), which may include parameters discussed above, such as interference history, etc., and/or other training information.

Figure 8:
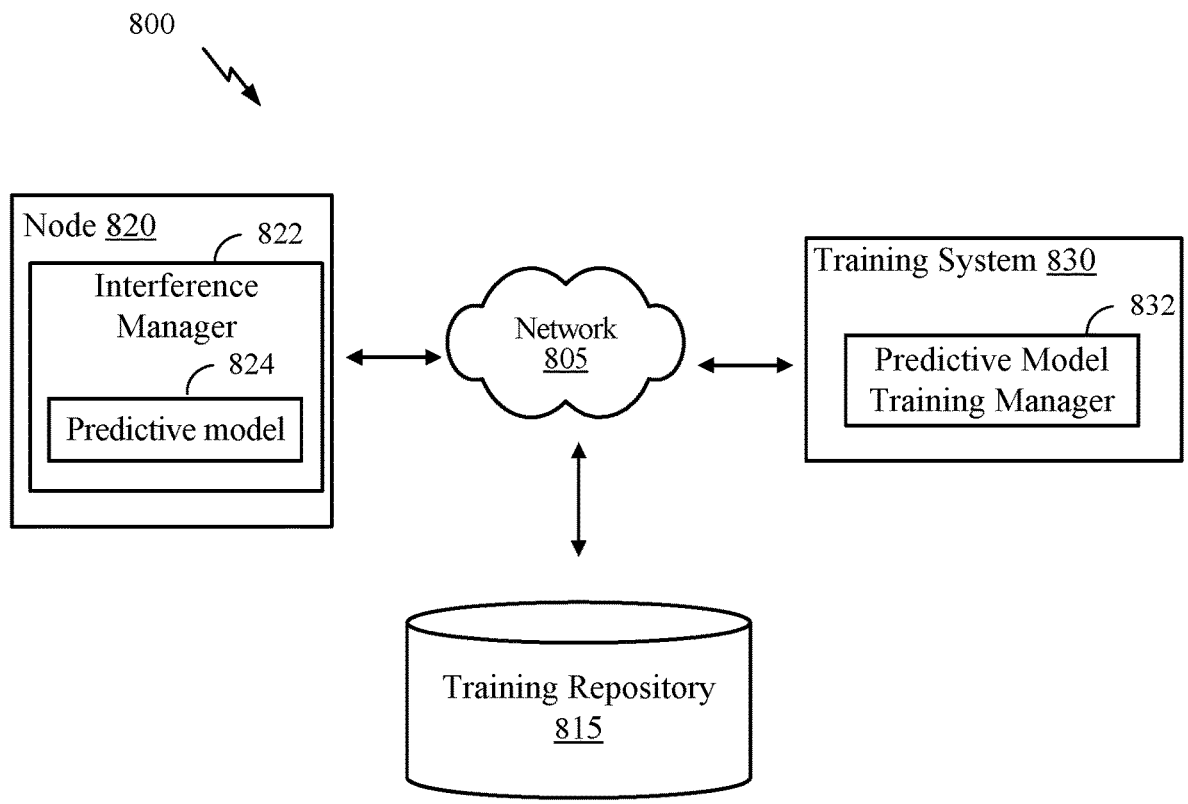
FIG. 8 illustrates an example networked environment in which a predictive model is used for channel estimates, according with certain aspects of the present disclosure.

FIG. 8 illustrates an example networked environment 800 in which a packet buffering duration manager 822 of a node 820 uses a predictive model 824 for dynamic determination of a packet buffering duration, according to certain aspects of the present disclosure. As shown in FIG. 8, networked environment 800 includes a node 820, a training system 830, and a training repository 815, communicatively connected via network(s) 805. The node 820 may be a UE (e.g., such as the UE 120a in the wireless communication network 100). The network(s) 805 may include a wireless network such as the wireless communication network 100, which may be a 5G NR network and/or an LTE network. While the training system 830, node 820, and training repository 815 are illustrated as separate components in FIG. 8, the training system 830, node 820, and training repository 8415 may be implemented on any number of computing systems, either as one or more standalone systems or in a distributed environment.

The training system 830 generally includes a predictive model training manager 832 that uses training data to generate the predictive model 824 for candidate interference level predictions. The predictive model 824 may be determined based, at least in part, on the information in the training repository 815.

The training repository 815 may include training data obtained before and/or after deployment of the node 820. The node 820 may be trained in a simulated communication environment (e.g., in field testing, drive testing) prior to deployment of the node 820. For example, various history information can be stored to obtain training information related to the estimates, predictions, etc.

This information can be stored in the training repository 815. After deployment, the training repository 815 can be updated to include feedback associated with packet buffering durations used by the node 820. The training repository can also be updated with information from other BSs and/or other UEs, for example, based on learned experience by those BSs and UEs, which may be associated with interference levels observed by those BSs and/or UEs.

The predictive model training manager 832 may use the information in the training repository 815 to determine the predictive model 824 (e.g., algorithm) used for candidate interference level prediction. The predictive model training manager 832 may use various different types of machine learning algorithms to form the predictive model 824. The training system 830 may be located on the node 820, on a BS in the network 805, or on a different entity that determines the predictive model 824. If located on a different entity, then the predictive model 824 is provided to the node 820. The training repository 8415 may be a storage device, such as a memory. The training repository 815 may be located on the node 820, the training system 830, or another entity in the network 805. The training repository 815 may be in cloud storage. The training repository 815 may receive training information from the node 820, entities in the network 805 (e.g., BSs or UEs in the network 805), the cloud, or other sources.

The machine learning may use any appropriate machine learning algorithm. In some non-limiting examples, the machine learning algorithm is a reinforcement learning algorithm, a value reinforcement algorithm, a supervised learning algorithm, an unsupervised learning algorithm, a deep learning algorithm, an artificial neural network algorithm, a Q-learning algorithm, a polar reinforcement algorithm, or other type of machine learning algorithm.

In some examples, the machine learning (e.g., used by the training system 830) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system 830) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system 830), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, the training system 830 generates vectors from the information in the training repository 815. In some examples, the training repository 815 stores vectors. In some examples, the vectors map one or more features to a label. For example, the features may correspond to various training parameters and/or upcoming slots and/or other factors discussed above. The label may correspond to the predicted likelihoods of candidate interference levels. The predictive model training manager 832 may use the vectors to train the predictive model 824 for the node 820. As discussed above, the vectors may be associated with weights in the machine learning algorithm.

Figure 9:
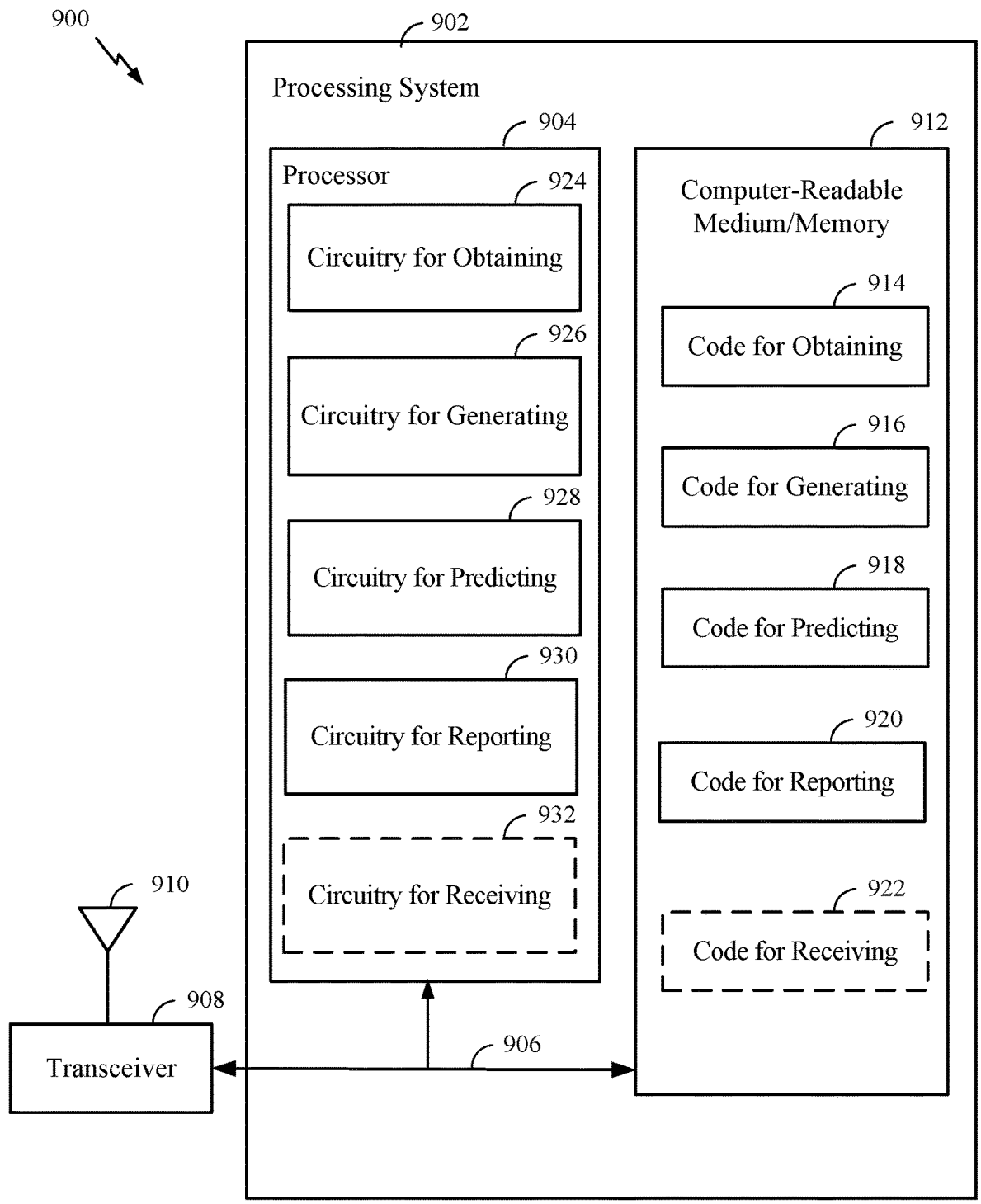
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 4. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 4, or other operations for performing the various techniques discussed herein for improving interference estimates for CSI reporting. In certain aspects, computer-readable medium/memory 912 stores code 914 for obtaining, from a network entity, a CSI reporting configuration for reporting CSI for a channel; code 916 for generating a model of an interference pattern for the channel; code 918 for predicting one or more candidate interference levels for one or more upcoming slots using the model; and code 920 for reporting information regarding the candidate interference levels to the network entity. In certain aspects, the processor 904 has circuitry configured to implement the code stored in the computer-readable medium/memory 912. In certain aspects, computer-readable medium/memory 912 may store code 920 for receiving signaling indicating a number, K, of upcoming slots for which the UE may predict candidate interference levels and a number, N, of previously observed interference levels. The processor 904 includes circuitry 924 for obtaining, from a network entity, a CSI reporting configuration for reporting CSI for a channel; circuitry 926 for generating a model of an interference pattern for the channel; circuitry 928 for predicting one or more candidate interference levels for one or more upcoming slots using the model; and circuitry 930 for reporting information regarding the candidate interference levels to the network entity. In certain aspects, processor 904 may include circuitry 932 for receiving signaling indicating a number, K, of upcoming slots for which the UE may predict candidate interference levels and a number, N, of previously observed interference levels.

For example, means for transmitting (or means for outputting for transmission) may include the transmitter unit 254 and/or antenna(s) 252 of the UE 120a illustrated in FIG. 2 and/or circuitry 930 of the communication device 900 in FIG. 9. Means for receiving (or means for obtaining) may include a receiver and/or antenna(s) 252 of the UE 120a illustrated in FIG. 2 and/or circuitry 924 of the communication device 700 in FIG. 9. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 902 of the communication device 900 in FIG. 9.

Figure 10:
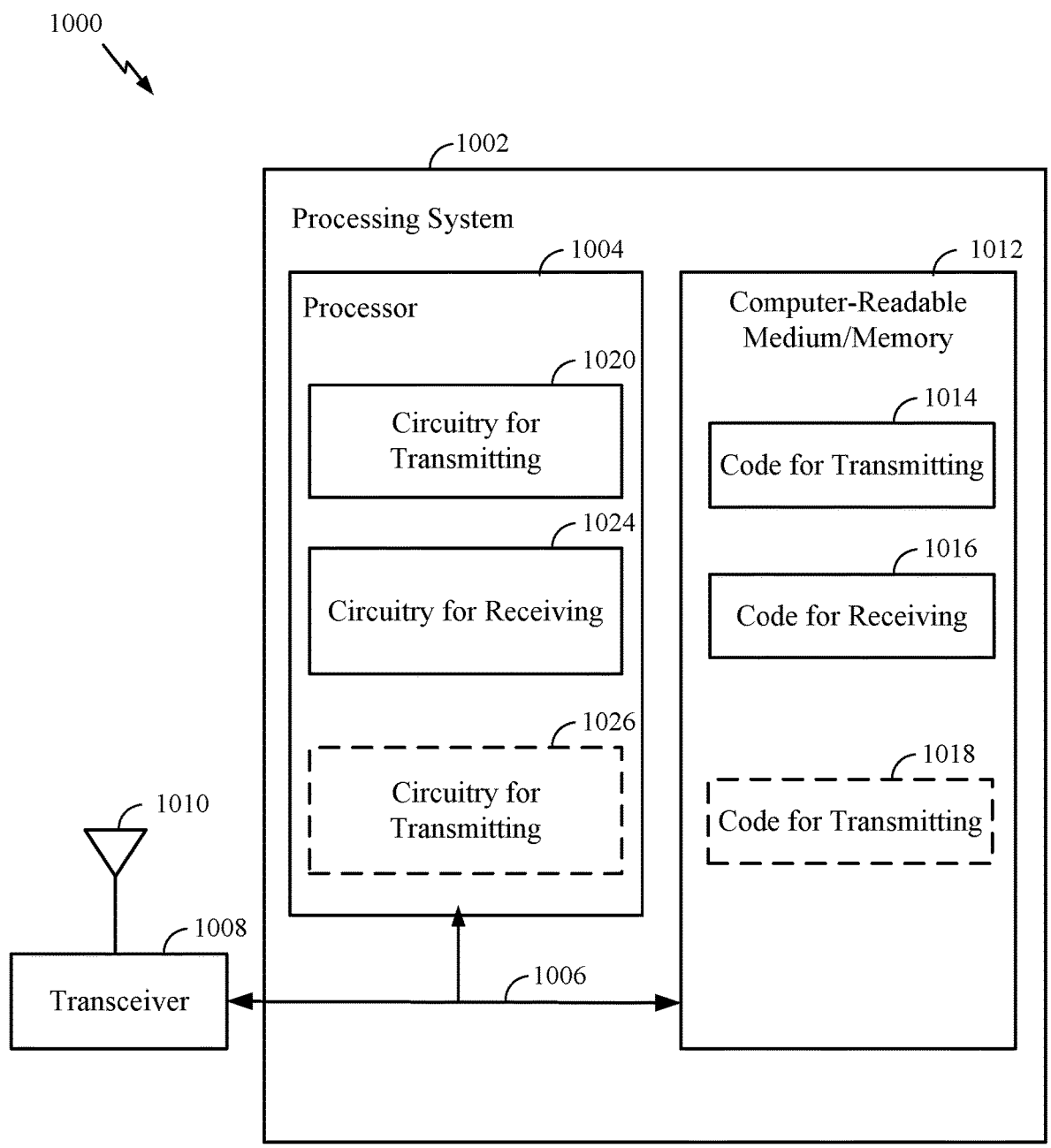
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 5. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, or other operations for performing the various techniques discussed herein for improving interference estimates for CSI reporting. In certain aspects, computer-readable medium/memory 1012 stores code 1014 for transmitting, to a UE, a CSI reporting configuration for reporting CSI for a channel; and code 1016 for receiving from the UE, as a part of the CSI reporting, information regarding candidate interference levels for one or more upcoming slots. In certain aspects, computer-readable medium/memory 1012 may store code 1018 for transmitting signaling indicating a number, K, of upcoming slots for which the UE may predict candidate interference levels and a number, N, of previously observed interference levels. In certain aspects, the processor 1004 has circuitry configured to implement the code stored in the computer-readable medium/memory 1012. The processor 1004 includes circuitry 1020 for transmitting, to a UE, a CSI reporting configuration for reporting CSI for a channel; and circuitry 1024 for receiving from the UE, as a part of the CSI reporting, information regarding candidate interference levels for one or more upcoming slots. In certain aspects, processor 804 may include circuitry 1026 for transmitting signaling indicating a number, K, of upcoming slots for which the UE may predict candidate interference levels and a number, N, of previously observed interference levels.

For example, means for transmitting (or means for outputting for transmission) may include a transmitter and/or an antenna(s) 234 or the BS 110a or the transmitter unit 254 illustrated in FIG. 2 and/or circuitry 1020 of the communication device 1000 in FIG. 10. Means for receiving (or means for obtaining) may include a receiver and/or an antenna(s) 234 of the BS 110a illustrated in FIG. 2 and/or circuitry 1024 of the communication device 1000 in FIG. 10. Means for communicating may include a transmitter, a receiver or both. Means for generating, means for configuring means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1002 of the communication device 1000 in FIG. 10.

Example Aspects

In a first aspect, a method for wireless communications by a user equipment (UE), includes obtaining, from a network entity, a channel state indicator (CSI) reporting configuration for reporting CSI for a channel; generating a model of an interference pattern for the channel; predicting one or more candidate interference levels for one or more upcoming slots using the model; and reporting information regarding the candidate interference levels to the network entity.

In a second aspect, in combination with the first aspect, the information regarding the candidate interference levels includes information from a probability density function (PDF) for the one or more upcoming slots.

In a third aspect, in combination with one or more of the first and second aspects, the information regarding the candidate interference levels includes pre-configured candidate interference levels and probability of occurrence for the pre-configured candidate interference levels.

In a fourth aspect, in combination with one or more of the first through third aspects, the information regarding the candidate interference levels includes information regarding a subset of the candidate interference levels selected based on their probability of occurrence.

In a fifth aspect, in combination with one or more of the first through fourth aspects, the method further includes mapping the one or more candidate interference levels to a transmission from one or more neighboring cells.

In a sixth aspect, in combination with one or more of the first through fifth aspects, the method further includes predicting the one or more candidate interference levels for K upcoming slots using the model and N previously observed interference levels.

In a seventh aspect, in combination with the sixth aspect, the method further includes receiving signaling indicating values of K and N.

In an eighth aspect, in combination with one or more of the sixth and seventh aspects, the method further includes determining a value for N based on at least one of: a CSI reference signal (CSI-RS) configuration; a physical downlink shared channel (PDSCH) message received in a slot quasi-colocated (QCLed) with the CSI-RS; or a combination thereof.

In a ninth aspect, in combination with one or more of the first through eighth aspects, the method further includes modelling time series data involving observed interference values.

In a tenth aspect, in combination with the ninth aspect, the model of the interference pattern takes into account a history of the observed interference values.

In an eleventh aspect, in combination with one or more of the ninth and tenth aspects, the method further includes generating the model using a neural network.

In a twelfth aspect, in combination with the eleventh aspect, the method further includes training the neural network in real-time using observed interference values.

In a thirteenth aspect, in combination with the twelfth aspect, the method further includes reporting the observed interference values.

In a fourteenth aspect, in combination with the eleventh aspect, the method further includes training the neural network offline using observed interference values.

In a fifteenth aspect, in combination with any of the eleventh through fourteenth aspects, the method further includes receiving, from the network entity, information regarding the neural network to use for generating the model.

In a sixteenth aspect, in combination with any of the eleventh through fifteenth aspects, the method further includes reporting, to the network entity, information regarding the neural network used for generating the model.

In a seventeenth aspect, in combination with any of the eleventh through sixteenth aspects, information regarding the neural network includes weights of the neural network after training the neural network.

In an eighteenth aspect, in combination with any of the first through seventeenth aspects, the method further includes reporting the information regarding the candidate interference levels to the network entity via a CSI-report.

In a nineteenth aspect, a method for wireless communications by a network entity, includes: transmitting, to a user equipment (UE), a channel state indicator (CSI) reporting configuration for reporting a CSI for a channel; and receiving from the UE, as part of the CSI reporting, information regarding one or more candidate interference levels for one or more upcoming slots.

In a twentieth aspect, in combination with the nineteenth aspect, the method further includes receiving the information regarding the candidate interference levels via a CSI-report.

In a twenty-first aspect, in combination with any of the nineteenth through twentieth aspects, the information regarding the candidate interference levels includes information from a probability density function (PDF) for the one or more upcoming slots.

In a twenty-second aspect, in combination with any of the nineteenth through twenty-first aspects, the information regarding the candidate interference levels includes pre-configured candidate interference levels and probability of occurrence for the pre-configured candidate interference levels.

In a twenty-third aspect, in combination with any of the nineteenth through twenty-second aspects, the information regarding the candidate interference levels includes information regarding a subset of the candidate interference levels, selected based on their probability of occurrence.

In a twenty-fourth aspect, in combination with any of the nineteenth through twenty-third aspects, the method further includes predicting the one or more candidate interference levels for K upcoming slots using a model and N previously observed interference levels.

In a twenty-fifth aspect, in combination with the twenty-fourth aspect, the method further includes transmitting signaling indicating values of K and N.

In a twenty-sixth aspect, in combination with any of the nineteenth through twenty-fifth aspect, the method further includes reporting observed interference values to enable training of a neural network model used for generating a model of an interference pattern.

In a twenty-seventh aspect, in combination with any of the nineteenth through twenty-sixth aspect, the method further includes transmitting, to the UE, information regarding a neural network model to use for generating a model of an interference pattern.

In a twenty-eighth aspect, in combination with any of the nineteenth through twenty-seventh, the method further includes receiving, from the UE, information regarding a neural network model used for generating a model of an interference pattern.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
at least one processor; and
memory coupled to the at least one processor, the memory comprising code executable by the at least one processor to cause the apparatus to:
obtain, from a network entity, a channel state indicator (CSI) reporting configuration for reporting CSI for a channel;
generate a model of an interference pattern for the channel;
predict one or more candidate interference levels for one or more upcoming slots using the model; and
report information regarding the one or more candidate interference levels to the network entity, wherein the information regarding the one or more candidate interference levels includes information regarding a subset of the one or more candidate interference levels selected based on their probability of occurrence.

2. The apparatus of claim 1, wherein the information regarding the one or more candidate interference levels includes information from a probability density function (PDF) for the one or more upcoming slots.

3. The apparatus of claim 1, wherein the information regarding the one or more candidate interference levels includes one or more pre-configured candidate interference levels and probability of occurrence for the one or more pre-configured candidate interference levels.

4. The apparatus of claim 1, wherein the at least one processor is configured to map the one or more candidate interference levels to a transmission from one or more neighboring cells.

5. The apparatus of claim 1, wherein the at least one processor is configured to model time series data involving observed interference values.

6. The apparatus of claim 5, wherein the at least one processor is configured to generate the model of the interference pattern by taking in account a history of the observed interference values.

7. The apparatus of claim 5, wherein the at least one processor is configured to generate the model using a neural network.

8. The apparatus of claim 7, wherein the at least one processor is configured to train the neural network in real-time using the observed interference values.

9. The apparatus of claim 8, wherein the at least one processor is further configured to report the observed interference values.

10. The apparatus of claim 7, wherein the at least one processor is configured to train the neural network offline using the observed interference values.

11. The apparatus of claim 7, wherein the at least one processor is further configured to receive, from the network entity, information regarding the neural network to use for generating the model.

12. The apparatus of claim 7, wherein the at least one processor is further configured to report, to the network entity, information regarding the neural network used for generating the model.

13. The apparatus of claim 7, wherein information regarding the neural network includes weights of the neural network after training the neural network.

14. The apparatus of claim 1, wherein the at least one processor is configured to report the information regarding the one or more candidate interference levels to the network entity via a CSI-report.

15. An apparatus for wireless communications, comprising:
at least one processor; and
memory coupled to the at least one processor, the memory comprising code executable by the at least one processor to cause the apparatus to:
obtain, from a network entity, a channel state indicator (CSI) reporting configuration for reporting CSI for a channel;

generate a model of an interference pattern for the channel;
predict one or more candidate interference levels for K upcoming slots using the model and N previously observed interference levels; and
report information regarding the one or more candidate interference levels to the network entity.

16. The apparatus of claim 15, wherein the at least one processor is further configured to receive signaling indicating values of K and N.

17. The apparatus of claim 15, wherein the at least one processor is further configured to:
determine a value for N based on at least one of:
a CSI reference signal (CSI-RS) configuration;
a physical downlink shared channel (PDSCH) message received in a slot quasi-colocated (QCLed) with the CSI-RS; or
a combination thereof.

18. An apparatus for wireless communications, comprising:
at least one processor; and
memory coupled to the at least one processor, the memory comprising code executable by the at least one processor to cause the apparatus to:
transmit, to a user equipment (UE), a channel state indicator (CSI) reporting configuration for reporting a CSI for a channel; and
receive from the UE, as part of the CSI reporting, information regarding one or more candidate interference levels for one or more upcoming slots, wherein the information regarding the one or more candidate interference levels includes information regarding a subset of the one or more candidate interference levels selected based on their probability of occurrence.

19. The apparatus of claim 18, wherein the memory comprises code executable by the at least one processor to cause the apparatus to receive the information regarding the one or more candidate interference levels via a CSI-report.

20. The apparatus of claim 18, wherein the information regarding the one or more candidate interference levels includes information from a probability density function (PDF) for the one or more upcoming slots.

21. The apparatus of claim 18, wherein the information regarding the one or more candidate interference levels includes one or more pre-configured candidate interference levels and probability of occurrence for the one or more pre-configured candidate interference levels.

22. The apparatus of claim 18, wherein the memory further comprises code executable by the at least one processor to cause the apparatus to report observed interference values to enable training of a neural network model used for generating a model of an interference pattern.

23. The apparatus of claim 18, wherein the memory further comprises code executable by the at least one processor to cause the apparatus to transmit, to the UE, information regarding a neural network model to use for generating a model of an interference pattern.

24. The apparatus of claim 18, wherein the memory further comprises code executable by the at least one processor to cause the apparatus to receive, from the UE, information regarding a neural network model used for generating a model of an interference pattern.

25. An apparatus for wireless communications, comprising:
at least one processor; and
memory coupled to the at least one processor, the memory comprising code executable by the at least one processor to cause the apparatus to:
transmit, to a user equipment (UE), a channel state indicator (CSI) reporting configuration for reporting a CSI for a channel;
receive from the UE, as part of the CSI reporting, information regarding one or more candidate interference levels for one or more upcoming slots; and
predict the one or more candidate interference levels for K upcoming slots using a model and N previously observed interference levels.

26. The apparatus of claim 25, wherein the memory further comprises code executable by the at least one processor to cause the apparatus to transmit signaling indicating values of K and N.

27. A method for wireless communications by a user equipment (UE), the method comprising:
obtaining, from a network entity, a channel state indicator (CSI) reporting configuration for reporting CSI for a channel;
generating a model of an interference pattern for the channel;
predicting one or more candidate interference levels for one or more upcoming slots using the model; and
reporting information regarding the one or more candidate interference levels to the network entity, wherein the information regarding the one or more candidate interference levels includes information regarding a subset of the one or more candidate interference levels selected based on their probability of occurrence.

28. A method for wireless communications by a network entity, comprising:
transmitting, to a user equipment (UE), a channel state indicator (CSI) reporting configuration for reporting a CSI for a channel; and
receiving from the UE, as part of the CSI reporting, information regarding one or more candidate interference levels for one or more upcoming slots, wherein the information regarding the one or more candidate interference levels includes information regarding a subset of the one or more candidate interference levels selected based on their probability of occurrence.

29. A method for wireless communications by a user equipment (UE), the method comprising:
obtaining, from a network entity, a channel state indicator (CSI) reporting configuration for reporting CSI for a channel;
generating a model of an interference pattern for the channel;
predicting one or more candidate interference levels for K upcoming slots using the model and N previously observed interference levels; and
reporting information regarding the one or more candidate interference levels to the network entity.

30. A method for wireless communications by a network entity, comprising:
transmitting, to a user equipment (UE), a channel state indicator (CSI) reporting configuration for reporting a CSI for a channel;
receiving from the UE, as part of the CSI reporting, information regarding one or more candidate interference levels for one or more upcoming slots; and
predicting the one or more candidate interference levels for K upcoming slots using a model and N previously observed interference levels.

* * * * *